March 16, 1943.  F. C. SILVA  2,313,898
FRUIT HALVING AND PITTING
Filed Aug. 11, 1941
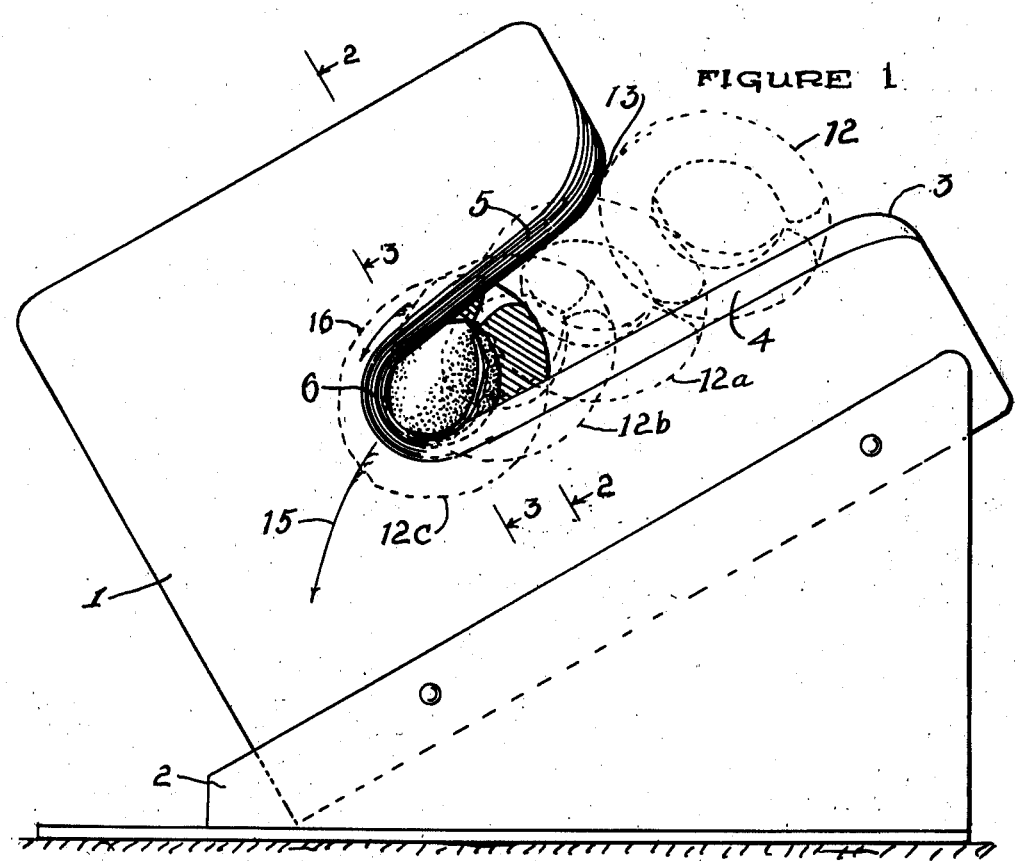
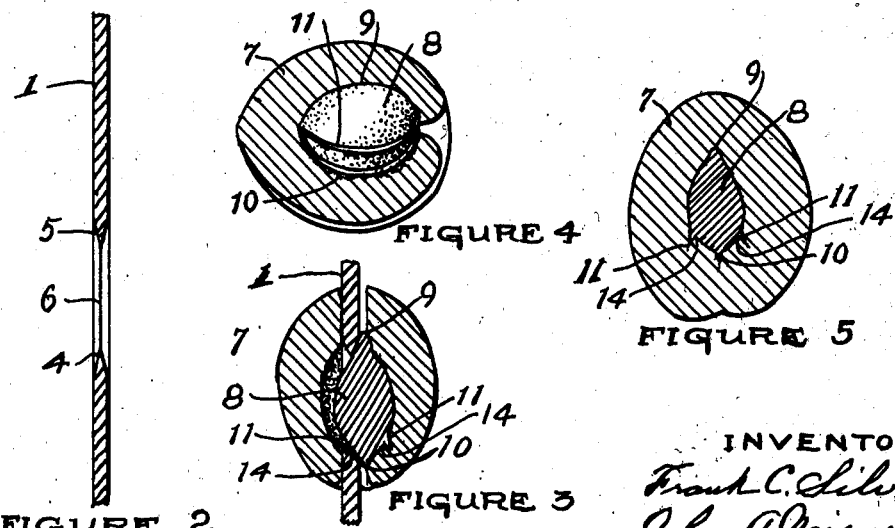
INVENTOR
Frank C. Silva
John A. Naismith
ATTORNEY Patented Mar. 16, 1943

2,313,898

UNITED STATES PATENT OFFICE 2,313,898

FRUIT HALVING AND PITTING

Frank C. Silva, San Jose, Calif.

Application August 11, 1941, Serial No. 406,300

1 Claim. (Cl. 146—28)

The present invention relates particularly to the halving and pitting of apricots preparatory to drying or canning.

In the preparation of apricots for drying or canning, it has heretofore been customary for the cutter to take a single apricot on one hand, and a short, straight-edged knife in the other hand, and then cut the flesh of the apricot along the dorsal-ventral plane of the pit by manipulating both the apricot and the knife. After the halves so formed are separated the pit is extracted from the half in which it still lies by further adjustment of the halves in the operator's hand, and further use of the knife. The season during which the apricots are in condition for canning or drying is a short one, and since a single large cannery will handle many tons of the fruit in a single season it is obvious that the speed with which the fruit may be halved and pitted is an exceedingly important problem. By greatly speeding up the cutting and pitting operation the period of time required to prepare a given quantity of fruit is materially reduced, or the number of operators may be materially reduced, in either case effecting an important saving to the cannery.

It is, therefore, one object of my invention to provide a means and method for cutting and pitting apricots that will obviate the necessity of using the customary short straight-edged knife, or any handled knife, and that will enable an operator to cut and pit an apricot quickly and smoothly in a single operation or movement of the hands.

It is also an object of the invention to provide a cutting knife constructed and arranged in such a manner as to enable an operator to cut and pit the fruit without danger of cutting the hands and without danger of mutilating the fruit.

In the drawing:

Figure 1 is a side elevation of a cutting knife embodying my invention and showing several successive positions of an apricot being cut and pitted.

Figure 2 is a sectional view of the knife on line 2—2 of Figure 1.

Figure 3 is a sectional view on line 3—3 of Figure 1, showing the final position of an apricot being cut and pitted on the knife.

Figure 4 is a sectional view through the pericarp of an apricot at the dorsal-ventral plane of the endocarp or stone, the stone being shown in elevation.

Figure 5 is a sectional view through an apricot on a plane perpendicular to the dorsal-ventral plane.

In carrying out my invention I provide a blade 1 of substantial thickness, in the present case one-eighth of an inch, and mount this blade rigidly on a rigid support as 2 at a suitable angle to the horizontal, in this case an angle of thirty degrees.

The cutting edge of the blade 3 is substantially U shaped in form, its lower arm 4 being substantially parallel with the angle of the blade, and its upper arm 5 being somewhat shorter and lying at a slightly greater angle. The upper and lower arms of the edge are joined at the base of the U in a circle as shown at 6. By forming the cutting edge in this manner an apricot may first be placed on the forwardly projecting portion of the lower arm and partially cut before it is brought into contact with the upper and shorter arm, and the space between the cutting edges is tapered somewhat. The space between the free ends of the arms 4 and 5 approaches in length that of the longer axis of the stone, while the diameter of the base circle 6 is less than the dorsal-ventral axis of the stone.

In Figures 4 and 5 the pericarp, or the edible portion of an apricot with its envelop, is shown at 7, and the endocarp or stone is indicated at 8. The dorsal suture of the stone 8 is indicated at 9 and the ventral suture at 10. On each side of the ventral suture 10 is an outwardly projecting fin or rib in which the ventral bundles are housed, these ribs being indicated at 11 and extending from end to end of the stone and spaced a little way from the ventral suture 10 as shown. These ribs 11 are curved, of course, and while they are spaced from the ventral suture 10 at their centers they join the ventral suture at their ends.

In cutting and pitting an apricot, the fruit is first placed on the projecting portion of the lower cutting edge as indicated in dotted lines at 12 with its dorsal-ventral plane coinciding with the plane of the blade 1, with the cutting edge entering the flesh to the stone 8, at its base or stem end, and at such an angle that the opposite point of the fruit is directed toward, and preferably contacts, the free end of the upper cutting edge 5 as at 13.

With the apricot in the position above described, the operator applies sufficient pressure to both sides of the fruit to push it forwardly into the position 12a, during which movement the fruit may be rotated slightly or not, thereby causing the upper cutting edge 5 to enter the flesh to the stone 8 as shown. As the fruit is pushed still further forwardly to the position 12b it is rotated to cut the flesh still more, but since the stone has now entered a narrowing part of the knife its ventral suture slips off of the edge of the blade and the stone slides a little way down the side of the knife edge until it seats in the shoulder 14 formed by the rib on that side of the stone. The further forward movement and rotation of the fruit seats the stone 8 against the rounded part of the knife edge at 6. In this position of the fruit, indicated in dotted lines at 12c, the stone is supported from below by the rib 11 and its upper portion adjacent its dorsal suture is in contact with the knife edge 5, consequently the continued forward movement and rotation of the fleshy halves, which by now have been cleanly cut apart, carries them on through some such arc as indicated at 15, leaving the stone 8 behind.

By mounting the blade 1 in substantially the position shown, and manipulating the apricot as described, both of the hands of the operator are free to handle the fruit and to place it on the knife in exactly the right position. This right position is easily determined because a shallow groove as indicated at 16 extends from end to end of the apricot on one side only and in the dorsal-ventral plane referred to.

Since the fingers of the two hands of the operator are pressed against the two opposite sides of the apricot, and since the stone must assume a position on one side or the other of the cutting edges as the fruit is advanced along the same, one side is moved laterally with respect to the stone and completely separated therefrom as the stone reaches its final position at edge 6 and as clearly shown in Figure 3. And as the slight lateral pressure of the fingers on the other side of the fruit holds the stone in fixed engagement with the knife edge when it reaches edge 6, the continued rotating movement described smoothly separates that half from the stone and the stone fall free.

From the foregoing it will be understood that the movement applied to the fruit is a compound one, being a rotative movement about its axis as indicated by the arrow 16, as well as a forwardly and then downwardly movement as indicated by the arrow 15.

Although but one specific embodiment of the invention has been herein illustrated and described, it will be understood that various alterations in the details of construction and mode of operation and application, may be made without departing from the scope of the invention as indicated in the accompanying claim.

I claim:

A fruit cutting knife comprising, a substantially U shaped cutting blade one-eighth of an inch thick rigidly mounted in a substantially vertical plane and at an angle of substantially thirty degrees to the horizontal, said blade having straight, opposed cutting edges, with its lower edge projecting beyond the upper edge, said edges converginging gradually and uniformly toward their base and then curved toward each other to form a substantially semicircular terminal cutting edge, and spaced apart a distance less than the length of the major axis of an apricot stone.

FRANK C. SILVA.